US010134092B1

(12) United States Patent
Harvey et al.

(10) Patent No.: US 10,134,092 B1
(45) Date of Patent: *Nov. 20, 2018

(54) METHOD AND SYSTEM FOR ASSESSING DAMAGE TO INSURED PROPERTIES IN A NEIGHBORHOOD

(71) Applicant: STATE FARM MUTUAL AUTOMOBILE INSURANCE COMPANY, Bloomington, IL (US)

(72) Inventors: Brian N. Harvey, Bloomington, IL (US); Nathan L. Tofte, Downs, IL (US); Roger D. Schmidgall, Normal, IL (US); Michael Jeffrey Aviles, Bloomington, IL (US); Kyle Pott, Bloomington, IL (US); Rosemarie Geier Grant, Ellsworth, IL (US); Michael Shawn Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/510,492

(22) Filed: Oct. 9, 2014

(51) Int. Cl.
*G06Q 40/00* (2012.01)
*G06Q 40/08* (2012.01)
*G06K 9/00* (2006.01)
*G06K 9/64* (2006.01)

(52) U.S. Cl.
CPC ......... *G06Q 40/08* (2013.01); *G06K 9/00637* (2013.01); *G06K 9/64* (2013.01)

(58) Field of Classification Search
CPC ....... G06Q 40/00; G06Q 40/02; G06Q 40/08; G06Q 50/16; G01J 1/00
USPC ........................................................ 705/4, 35
See application file for complete search history.

(56) References Cited

U.S. PATENT DOCUMENTS

| 7,809,587 B2 | 10/2010 | Dorai et al. | |
| 8,346,578 B1* | 1/2013 | Hopkins, III | G06Q 40/00 382/100 |
| 8,380,545 B2* | 2/2013 | Chen | G06Q 20/10 705/39 |

(Continued)

OTHER PUBLICATIONS

U.S. Appl. No. 14/510,307 entitled "Method and System for Determining the Condition of Insured Properties in a Neighborhood," filed Oct. 9, 2014.

(Continued)

*Primary Examiner* — Chikaodinaka Ojiaku
(74) *Attorney, Agent, or Firm* — Marshall, Gerstein & Borun LLP; Randall G. Rueth

(57) ABSTRACT

A method and system may assess the damage to insured properties in a neighborhood using aerial images captured from an unmanned aerial vehicle (UAV) or from a satellite device. The neighborhood may be selected by identifying a neighborhood affected by a catastrophe and having a large concentration of properties which are insured by a particular insurance provider. Aerial images of the entire neighborhood may then be captured and received from the UAV or the satellite device. For each insured property in the neighborhood, a condition and the extent and/or severity of the damage may be automatically determined based on the received aerial images. The aerial images along with indications of the extent of the damage may be displayed.

19 Claims, 6 Drawing Sheets

(56) References Cited

U.S. PATENT DOCUMENTS

| | | | |
|---|---|---|---|
| 8,666,786 | B1 | 3/2014 | Wirz et al. |
| 8,756,085 | B1 | 6/2014 | Plummer et al. |
| 8,818,572 | B1 * | 8/2014 | Tofte .................. B64C 39/024 |
| | | | 244/75.1 |
| 8,872,818 | B2 * | 10/2014 | Freeman ............... G01S 17/023 |
| | | | 345/419 |
| 8,874,454 | B2 | 10/2014 | Plummer et al. |
| 9,002,719 | B2 | 4/2015 | Tofte |
| 9,262,789 | B1 | 2/2016 | Tofte |
| 9,489,696 | B1 | 11/2016 | Tofte |
| 9,612,598 | B2 | 4/2017 | Schultz et al. |
| 9,633,146 | B2 | 4/2017 | Plummer et al. |
| 2007/0070185 | A1 * | 3/2007 | Dy ......................... H04N 7/181 |
| | | | 348/14.03 |
| 2007/0260401 | A1 * | 11/2007 | Sydor .................... G06Q 40/08 |
| | | | 702/1 |
| 2009/0265193 | A1 | 10/2009 | Collins et al. |
| 2012/0033851 | A1 | 2/2012 | Chen et al. |
| 2014/0019166 | A1 * | 1/2014 | Swanson ............... G06Q 40/08 |
| | | | 705/4 |
| 2014/0100889 | A1 | 4/2014 | Tofte |
| 2014/0245210 | A1 | 8/2014 | Battcher et al. |
| 2014/0259549 | A1 | 9/2014 | Freeman et al. |
| 2014/0270492 | A1 | 9/2014 | Christopulos et al. |
| 2014/0278573 | A1 | 9/2014 | Cook |
| 2014/0278587 | A1 | 9/2014 | Plummer et al. |
| 2014/0320651 | A1 | 10/2014 | McClatchie et al. |
| 2014/0324483 | A1 | 10/2014 | Plummer et al. |
| 2014/0334689 | A1 | 11/2014 | Butler et al. |

OTHER PUBLICATIONS

U.S. Appl. No. 14/510,536 entitled "Method and System for Generating Real-Time Images of Customer Homes During a Catastrophe," filed Oct. 9, 2014.

U.S. Appl. No. 14/510,784 entitled "Method and System for Assessing Damage to Infrastructure," filed Oct. 9, 2014.

Samadzadegan et al., "Earthquake destruction assessment of urban road network using satellite imagery and fuzzy interference systems," Proc. The International Archives of the Photogrammetry, Remote Sensing and Spatial Information Sciences, 2008, pp. 409-414.

Atkins et al., "An Integrated damage, visual, and radar analysis of the 2013 Moore Oklahoma EF5 tornado," American Meteorological Society, Jul. 2014.

Li et al., "Study on road damage assessment based on RS and GIS," IGARSS 2010.

Yamazaki, "Applications of remote sensing and GIS for damage assessment," In: ICUS/INCEDE Report 1, Joint Workshop on Urban Safety Engineering, Bangkok, 2001.

Office Action issued in U.S. Appl. No. 14/510,784 dated Nov. 25, 2014.

Office Action issued in U.S. Appl. No. 14/510,307 dated Dec. 18, 2014.

Office Action issued in U.S. Appl. No. 14/510,536 dated Dec. 23, 2015.

Office Action issued in U.S. Appl. No. 14/510,307 dated Nov. 19, 2015.

Office Action issued in U.S. Appl. No. 14/510,536 dated Nov. 27, 2015.

Office Action issued in U.S. Appl. No. 14/808,502 dated Nov. 27, 2015.

Gong et al. "Road damage detection from high-resolution RS image," IGARSS 2012.

Wang et al., "An object oriented method for road damage detection from high resolution remote sensing images," 19th International Conference on Geoinformatics, 2011.

Liu et al., "Object-oriented remote sensing image classification and road damage adaptive extraction," RSETE 2013.

Office Action issued in U.S. Appl. No. 14/510,307 dated May 20, 2016.

Office Action issued in U.S. Appl. No. 14/510,536 dated May 25, 2016.

U.S. Appl. No. 15/165,457, filed May 26, 2016.

Office Action issued in U.S. Appl. No. 15/718,323 dated Oct. 26, 2017.

Office Action issued in U.S. Appl. No. 14/510,307 dated Jun. 26, 2017.

Office Action issued in U.S. Appl. No. 14/510,536 dated Jun. 27, 2017.

U.S. Appl. No. 15/890,940, filed Feb. 7, 2018.

U.S. Appl. No. 15/837,649, filed Dec. 11, 2017.

U.S. Appl. No. 15/718,323, filed Sep. 28, 2017.

Brunner at al., "Earthquake damage assessment of building using VHR optical and SAR Imagery," IEEE Transactions on Geoscience and Remote Sensing, vol. 48, No. 5, May 2010.

Office Action issued in U.S. Appl. No. 14/510,307 dated Jun. 24, 2015.

Office Action issued in U.S. Appl. No. 14/510,536 dated Jul. 6, 2015.

* cited by examiner

METHOD AND SYSTEM FOR ASSESSING DAMAGE TO INSURED PROPERTIES IN A NEIGHBORHOOD

RELATED APPLICATIONS

This application is related to the following applications: co-pending U.S. patent application Ser. No. 14/510,307 entitled "METHOD AND SYSTEM FOR DETERMINING THE CONDITION OF INSURED PROPERTIES IN A NEIGHBORHOOD" and filed concurrently herewith; co-pending U.S. patent application Ser. No. 14/510,536 entitled "METHOD AND SYSTEM FOR GENERATING REAL-TIME IMAGES OF CUSTOMER HOMES DURING A CATASTROPHE" and filed concurrently herewith; and co-pending U.S. patent application Ser. No. 14/510,784 entitled "METHOD AND SYSTEM FOR ASSESSING DAMAGE TO INFRASTRUCTURE" and filed concurrently herewith, the entire disclosures of which are hereby expressly incorporated by reference.

TECHNICAL FIELD

The present disclosure generally relates to a method and system for assessing damage and, more particularly to a method and system for providing aid and claim assessments for insured properties during a catastrophe.

BACKGROUND

After an accident or loss, property owners typically file claims with their insurance companies. In response to these claims, the insurance companies assign an agent to investigate the claims to determine the extent of damage and/or loss and to provide their clients with appropriate compensation.

Often, the claim investigations can be time-consuming, difficult and even dangerous for the insurance agents. For example, in order to investigate the risk and exposures of a home owner's roof, an agent may have to climb onto the roof, and perform inspections while on the owner's roof. By climbing on the roof and attempting to maneuver around the roof to perform his inspection, the insurance agent opens himself to a real risk of injury, especially in difficult weather conditions where the roof may be slippery because of rain, snow, and/or ice and winds may be severe.

Even if the insurance agent performs the inspection without getting injured, performing the full investigation may still be time-consuming. In addition to the time required to drive to and from the property and to perform the inspection itself, significant paperwork and calculations may be involved in calculating compensation owed to the customers. For example, if an insurance agent takes photos on the roof of a customer's building in order to assess a claim for roof damage from a hurricane, in order to calculate how much money should be paid to the client, the agent may have to come back to his office, research the customer's property, research the cost of the damaged property and research repair costs. All of these steps are time consuming and both delay payment to the customer and prevent the agent from assessing other customer claims.

In situations where the insurance provider has received a large number of claims in a short time period (e.g., when a town is affected by a hurricane, tornado, or other natural disaster), an insurance agent may not have time to perform timely claim investigations of all the received claims. If claim investigations are not performed quickly, property owners may not receive recovery for their losses for long periods of time. Additionally, long time delays when performing claim investigations can lead to inaccurate investigation results (e.g., the delay may lead to increased opportunity for fraud and/or may make it more difficult to ascertain the extent of the damage at the time of the accident and/or loss).

SUMMARY

To assess the extent or severity of the damage to insured properties in a neighborhood, an automated damage assessment system may identify a neighborhood affected by a catastrophe and containing a large concentration of properties that are insured by the same insurance provider. For example, the system may identify a neighborhood having property damage from a catastrophe which occurred within the last month. Additionally, more than 20 percent of the properties in the neighborhood may be insured by the same insurance provider. Once the neighborhood is identified, the system may perform claim assessments for the properties in a single, automatic inspection, for example by automatically surveying the entire neighborhood at once, instead of one property at a time.

The automatic inspection may be performed by an unmanned aerial vehicle (UAV), or by a swarm of UAVs working together, which may be controlled by an insurance agent or by the system and flown all over the neighborhood to capture aerial images of the properties. Alternatively, the automatic inspection may be performed by a satellite which also captures aerial images of the properties within the neighborhood. Moreover, the inspection may also be performed by a manned aerial vehicle (MAV) which captures aerial images of the properties while flying over the neighborhood. Each captured aerial image may be associated with a location, for example a GPS location, and the GPS location may be used to determine the owner of the property which is displayed in the captured aerial image. If the property owner is insured by the insurance provider, the aerial image may be used to determine the condition of the property as well as the extent or severity of the damage to the property. In this manner, the claim assessment for an insured property can be performed proactively, before the property owner files an insurance claim. This creates an enhanced level of customer service and also eliminates the risk of injury to an insurance agent and the risk of fraud from a customer. Moreover, the system provides a speedy and efficient method of performing claim assessments by investigating an entire neighborhood in one inspection rather than investigating one insured property at a time.

In addition to performing claim assessments, the damage assessment system may also deploy resources and retrieve items from the insured properties. For example, if the aerial images display a missing roof from one of the insured properties, the UAV(s) or another device may be directed to transport a healing substance (e.g., tarp) and place it where the roof used to be to fix the damage to the roof or to act as temporary shelter. The UAV(s) may also be directed to transport food or water to people trapped inside the property. Moreover, the aerial images may display valuable items which have become dangerous or impossible to retrieve manually because of the property damage. The UAV(s) or another device may retrieve these items and deliver them to the property owner.

In an embodiment, a method for assessing damage to insured properties in a neighborhood using aerial images is provided. The method includes identifying a neighborhood including a concentration of insured properties which is above a predetermined threshold concentration level, wherein the neighborhood has been affected by a natural or a man-made disaster. The method further includes receiving a plurality of aerial images, wherein the plurality of aerial images display the neighborhood including the insured properties. For each of the insured properties in the identified neighborhood, the method includes determining one or more aerial images of the plurality of aerial images which display at least a portion of an insured property of the insured properties, determining a condition of the insured property based on the respective one or more aerial images corresponding to the insured property, and assessing a damage severity level of the insured property based on the condition of the insured property.

In another embodiment, a system for assessing damage to insured properties using aerial images is provided. The system includes a user interface, a communication network, and one or more computing devices communicatively coupled to the communication network and the user interface, each of the one or more computing devices having a memory and one or more processors. At least one of the computing devices is configured to identify a neighborhood including a concentration of insured properties which is above a predetermined threshold concentration level, wherein the neighborhood has been affected by a natural or a man-made disaster. At least one of computing devices is further configured to receive a plurality of aerial images via the communication network, wherein the plurality of aerial images display the neighborhood including the insured properties. For each of the insured properties in the identified neighborhood, at least one of the computing devices is configured to determine one or more aerial images of the plurality of aerial images which display on the user interface at least a portion of an insured property of the insured properties, determine a condition of the insured property based on the respective one or more aerial images corresponding to the insured property, and assess a damage severity level of the insured property based on the condition of the insured property.

In yet another embodiment, a method for deploying resources to damaged properties is provided. The method includes identifying a neighborhood including properties wherein the neighborhood has been affected by a natural or a man-made disaster. The method further includes receiving a plurality of aerial images, wherein the plurality of aerial images display the neighborhood including the properties. For each of the properties in the identified neighborhood, the method includes determining one or more aerial images of the plurality of aerial images which display at least a portion of a property of the properties, assessing a damage severity level of the property based on the condition of the property, and directing one or more resources to be deployed to the property based on at least one of: the damage severity level or the one or more aerial images of the property.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1A:
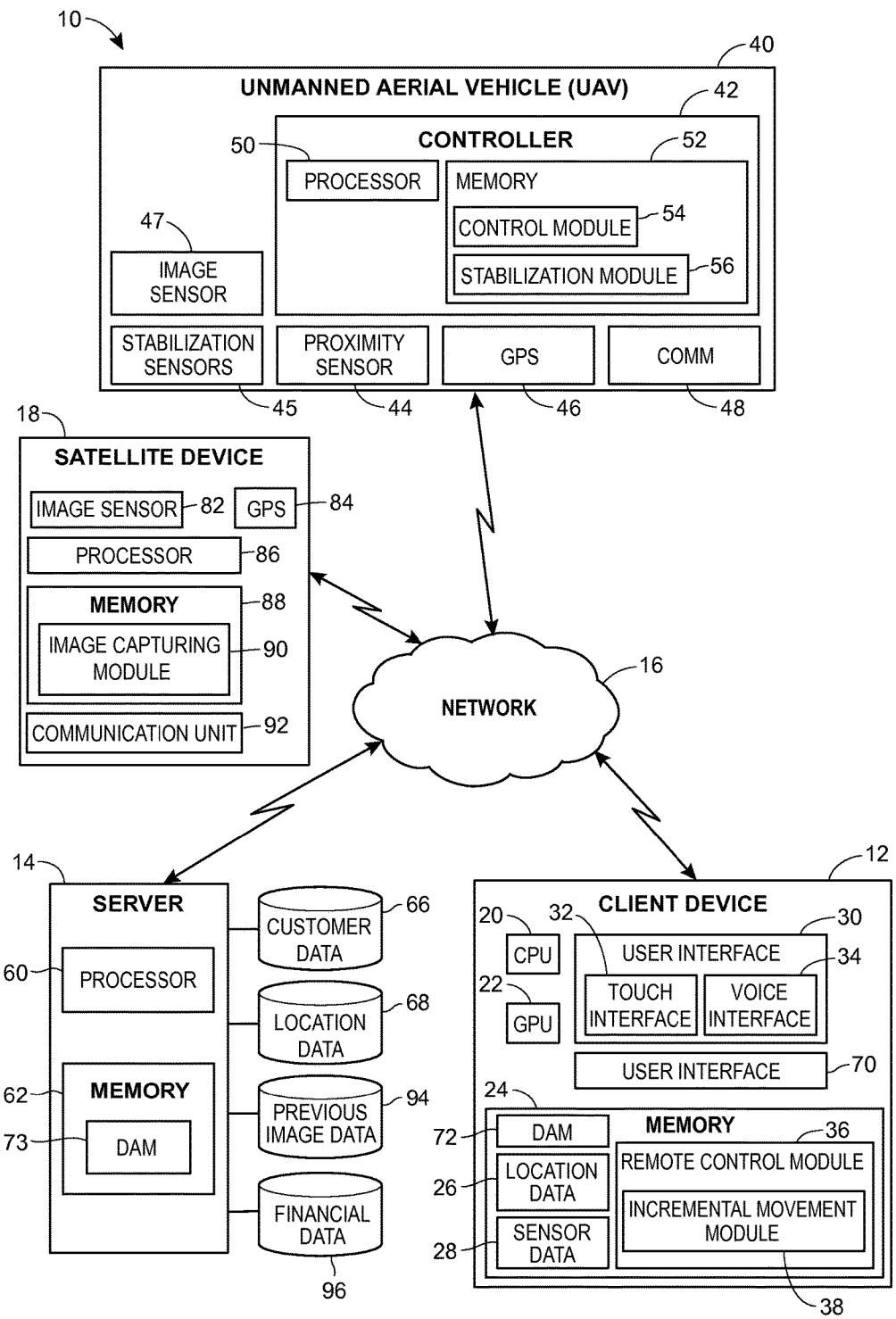
FIG. 1A illustrates a block diagram of an example system in which techniques for performing automatic claim assessments of insured properties in a neighborhood are implemented.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "aerial image" as used herein, may be used to refer to any image data within the electromagnetic spectrum (i.e. including the visible light spectrum as well as the invisible light spectrum), which is captured from an elevated position. Aerial images may include visible light imaging, radar imaging, near infrared imaging, thermal infrared imaging, hyperspectral imaging, multispectral imaging, full spectral imaging, etc. For example, an image captured by a satellite, a manned aerial vehicle (MAV) or an unmanned aerial vehicle (UAV) may be referred to herein as an "aerial image." An aerial image may be made up of data points, for example pixel data points, where each data point may correspond to a specific global positioning system (GPS) location. An aerial image may also include video captured from an elevated position.

Also, the term "catastrophe" as used herein, may be used to refer to any natural or man-made disaster. A natural disaster may include: a tornado, a hurricane, an avalanche, an earthquake, a flood, a tsunami, a volcanic eruption, a hail storm, a wildfire, a thunderstorm, etc. A man-made disaster may include: a nuclear incident, a war, an act of terrorism, etc.

The term "insurance provider" as used herein, generally refers to a party or entity (e.g., a business or other organizational entity) that provides insurance products, e.g., by offering and issuing insurance policies. Typically, but not necessarily an insurance provider may be an insurance company. Further, an insurance provider can be any individual, group of individuals, company, corporation, or other type of entity that can issue insurance policies for customers, such as insurance policies associated with properties.

An insurance provider may offer or provide one or more different types of insurance policies. Types of insurance policies may include, for example, homeowner's insurance; condominium owner's insurance; renter's insurance; business insurance (e.g., property, liability, inland marine and mobile property, etc.); insurance for catastrophic events such as flood, fire, volcano damage, etc.; personal liability insurance; and other types of insurance products. In embodiments as described herein, the insurance providers initiate and/or process claims related to insurance policies that cover one or more properties (e.g., homes, condominiums, apartments, mobile homes, house boats, etc.).

Generally speaking, to perform the automatic claim assessment process, an aerial image capturing device which may be a satellite, MAV, or one or several UAV(s) is/are directed to capture images within an identified neighborhood affected by a catastrophe and having a large percentage of properties which are insured by an insurance provider. The aerial image capturing device may be directed by a client device having user controls for determining the location and the amount of photographs or video captured. The captured aerial images may then be provided to the client device or to a server computer and grouped based on their GPS locations to determine a group of aerial images which correspond to an insured property. Each group of aerial images corresponding to an insured property may be aggregated, for example using photogrammetry, to create a 3-dimensional (3D) image of the insured property.

The 2D or 3D image may be displayed on the client device and may be created at a predefined level of detail (e.g., accurate to within ten percent) and/or may be adjustable (e.g., a user of the system may be able to "zoom in" or "zoom out" of the image). Moreover, the 2D or 3D image may be divided into property components, such as a window, a roof, a door, siding, an exterior wall, a front lawn, a backyard, an outdoor swimming pool, a fence, a tree, a deck, a patio, etc. Each of these property components may then be compared to other images of the same respective property component for determining the condition of the component. For example, an image of the roof may be compared to an image of the roof taken before the catastrophe or to an image of a perfectly intact roof. The condition of each property component may be used to determine the severity of the damage (also referred to herein as "the damage severity level") to the property component. This damage severity level may be provided to an insurance agent, for example, on the user interface of the client device, for determining an appropriate claim amount. Alternatively, the client device or the server computer may automatically determine an appropriate claim amount based on the damage severity level and/or the aerial images.

The determined claim amount may be used for "pre-filling" forms associated with an insurance claim before the property owner requests the claim. It should be appreciated that "forms" as discussed herein, can be understood to be any physical or electronic documentation, writing, etc., that is capable of being populated with data or information. For example, the forms can be populated with customer information, as well as details about actual or potential damage to properties resulting from the catastrophe. Some or all of the information on an insurance claim form may be automatically filled and sent to the property owner via email, a website interface, etc. The property owner may then review/modify and confirm the information is correct and as a result, payment from the insurance claim may be received shortly thereafter. In some embodiments, the insurance claim forms may be associated with the property owner and stored in a customer database.

In addition to directing the UAV(s) to capture aerial images, the client device may also direct the UAV(s) to drop off resources at the damaged properties. Resources may include food, water, storage boxes for saving valuables, containers, a healing substance rescue assistance, etc. The UAV(s) may carry some or all of these resources and the user may direct the UAV(s) to drop off the resources via user controls on the client device. For example, the UAV(s) may capture video of a home with people trapped inside. The user may view this on a display of the client device and before rescue assistance can be provided, the user can direct the UAV(s) to drop food and water into the home. Further, the UAV(s) can also be directed to pick up items from the damaged insured properties. For example, a home decimated by a tornado may not be safe for people to return to and search for important items. However, the property owners or the user may direct the UAV(s) to pick up some of the items displayed in the aerial images.

FIG. 1A illustrates various aspects of an exemplary environment implementing an automated damage assessment system 10 (also referred to herein as "the system"). The system 10 may include a client device 12 with remote control capabilities coupled to one or several unmanned aerial vehicles (UAVs) 40, an MAV, a satellite device 18, and a server 14 via a communication network 16. The client device 12 may be, for example, a laptop computer, a tablet computer, a smartphone, a wearable device, etc. In the embodiment illustrated in FIG. 1A, the client device 12 may include a central processing unit (CPU) 20, a graphics processing unit (GPU) 22, a computer-readable memory 24, and a first user interface 30 for controlling the UAV(s) 40 or the satellite device 18. The first user interface 30 may include a touch interface 32, voice interface 34, etc. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. In other implementations, the voice interface 34 may include any device that includes a microphone, such as a Bluetooth ear piece, a smartphone, etc. The client device 12 may further include a second user interface 70 which may be used for viewing aerial images captured by the UAV(s) 40, an MAV, or the satellite device 18. In some embodiments, the first user interface 30 and the second user interface 70 may be implemented on one user interface which includes user controls for directing the UAV(s) 40 or the satellite device 18 and displays the aerial images after the aerial images have been captured.

The memory 24 is a computer-readable non-transitory storage device that may include both persistent (e.g., a hard disk) and non-persistent (e.g., RAM) memory components, stores instructions executable on the CPU 20 and/or the GPU 22 that make up a damage assessment module (DAM) 72, a remote control module 36 and location data 26 and sensor data 28 on which the remote control module 36 operates. The remote control module 36 includes an incremental movement module 38 that allows a user to easily control the UAV(s) 40 via step-like, incremental movements in which one incremental movement is in response to one single user command.

The remote control module 36 and the damage assessment module 72 according to various implementations operate as separately executable software applications, plugins that extend the functionality of another software application such as a web browser, application programming interfaces (API) invokable by a software application, etc. The instructions that make up the remote control module 36 and the damage assessment module 72 may be compiled and executable on the CPU 20 and/or the GPU 22 directly, or not compiled and interpreted by the CPU 20 at runtime. However, FIG. 1A merely illustrates a condensed version of the client device 12, and a more detailed version of the client device 12 is described below with reference to FIG. 1B.

Referring still to FIG. 1A, each UAV 40 includes a controller 42 that communicates with one or more proximity sensors 44, one or more stabilization sensors 45, a Global Positioning System (GPS) unit 46, an image sensor 47, and a communications unit 48. The image sensors 47 may include one or more filters for infrared imaging, hyperspectral imaging, multispectral imaging, full spectral imaging, etc., or alternatively, the image sensors 47 may include one or more sensors which receive image data outside of the visible light spectrum such as an infrared image sensor. The controller 42 includes a processor 50 that executes instructions from a computer-readable memory 52 to implement a control module 54 and a stabilization module 56. The control module 54 may invoke the stabilization module 56 to retrieve data from the stabilization sensors 45 (i.e., sensors relating to avionics) to implement a control function, such as that associated with a control routine that performs PID (proportional-integral-derivative), fuzzy logic, nonlinear, etc. control to maintain the stability of the UAV(s) 40. For instance, the stabilization sensors 45 may include one or more of a directional speed sensor, a rotational speed sensors, a tilt angle sensor, an inertial sensor, an accelerometer sensor, or any other suitable sensor for assisting in stabilization of an aerial craft. Of course, the stabilization module 56 may implement any suitable technique of stabilizing the remote aerial device 40 in a hover or stationary three dimensional position.

The control module 54 may retrieve data from the proximity sensors 44. These proximity sensors 44 may include any sensor or technique that assists the control module 44 in determining a distance and a direction to the insured properties within the neighborhood. The one or more proximity sensors 44 may include optic flow sensors, ultrasonic sensors, infrared sensors, LIDAR (Light Detection and Ranging), a stereo vision system (SVS) that may utilize the image sensors 47 (e.g., one or more cameras) to implement stereoscopic imaging techniques to capture aerial images of the neighborhood including the insured properties and to create 3D images of the insured properties. The control module 54 may also receive instructions from the client device 12 to capture aerial images at specific locations or time intervals.

The GPS unit 46 may use "Assisted GPS" (A-GPS), satellite GPS, or any other suitable global positioning protocol or system that locates the position of the UAV(s) 40. Moreover, the GPS unit 46 may also determine the position of the aerial images or of data points within the aerial images captured by the UAV(s) 40, or the GPS may be combined with the distance and direction sensors 44 to determine the position of the aerial images, and positions of data points within an aerial image. For example, A-GPS utilizes terrestrial cell phone towers or wi-fi hotspots (e.g., wireless router points) to more accurately and more quickly determine the location of the device while satellite GPS generally are more useful in more remote regions that lack cell towers or wi-fi hotspots. The communication unit 48 may communicate with the server 14 or the client device 12 via any suitable wireless communication protocol network, such as a wireless telephony network (e.g., GSM, CDMA, LTE, etc.), a wi-fi network (802.11 standards), a WiMAX network, a Bluetooth network, etc.

Moreover, the UAV(s) 40 may include physical storage space to transport resources such as food, water, storage boxes, containers, a healing substance, survival kits, tools, etc. The physical storage space may be located within the body of the UAV(s) 40. Additionally, the UAV(s) may also include a device for retrieving items such as a claw, robot arm or electronic grabber (not shown). Items retrieved by an electronic grabber may be stored within the physical storage space of the UAV(s) 40.

As mentioned above, the system 10 may also include a satellite device 18 which includes an image sensor 82 for capturing aerial images and a GPS unit 84 for determining the position of each image. For example, the satellite device 18 may determine GPS coordinates of the boundaries of an aerial image, and also may determine GPS coordinates of data points, such as pixel data points, of the aerial image. The satellite device 18 may also include a processor 86 which executes instructions from a computer-readable memory 88 to implement an image capturing module 90, which may capture and transmit satellite images at the request of the client device 12. For example, the client device 12 may request satellite images between specified GPS coordinates, and the image capturing module 90 may transmit satellite images within the specified coordinates. Moreover, in some embodiments the client device 12 may specify the number of satellite images for the image capturing module 90 to capture and the zoom level. The client device 12 or the server 14 and the satellite device 18 may communicate via a communication unit 92 via any suitable wireless communication protocol network, such as a wireless telephony network (e.g., GSM, CDMA, LTE, etc.), a wi-fi network (802.11 standards), a WiMAX network, a Bluetooth network, etc.

The server 14 may include customer data (e.g., customer biographical information, type of property, etc.), location data (e.g., a property location of a customer, etc.), previous image data (e.g., aerial images of insured properties taken at an earlier date), and financial data (e.g., property estimates of property and materials similar to those that were damage or destroyed, labor costs for repairing/replacing the property, etc.) from a customer database 66, a location database 68, a previous image database 94, and a financial database 96, respectively. The server 14 then may provide the customer data, the location data, the previous image data, the financial data and appropriate indications of how certain portions of the customer data and the location data are linked, to the client device 12 as part of the location data 26. The client device 12 may use this location data to determine a geographic location that the UAV(s) 40 is/are initially sent to and may use the previous image data to determine a condition of an insured property as compared to its previous condition. The financial data may be used for performing cost estimates/claim assessments for repairing damaged properties. The customer database 66, the location database 68, the previous image database 94 and the financial database 96 may be disposed within the client device 12 depending on the implementation. The server may also include a processor 60 which executes instructions from a computer-readable memory 62 to implement a damage assessment module 73, which may be the same as the damage assessment module 72 of the client device 12. In some embodiments, the damage assessment module 72 may be disposed in the client device 12, in the server 14 or in a combination of the server 14 and the client device 12.

Figure 1B:
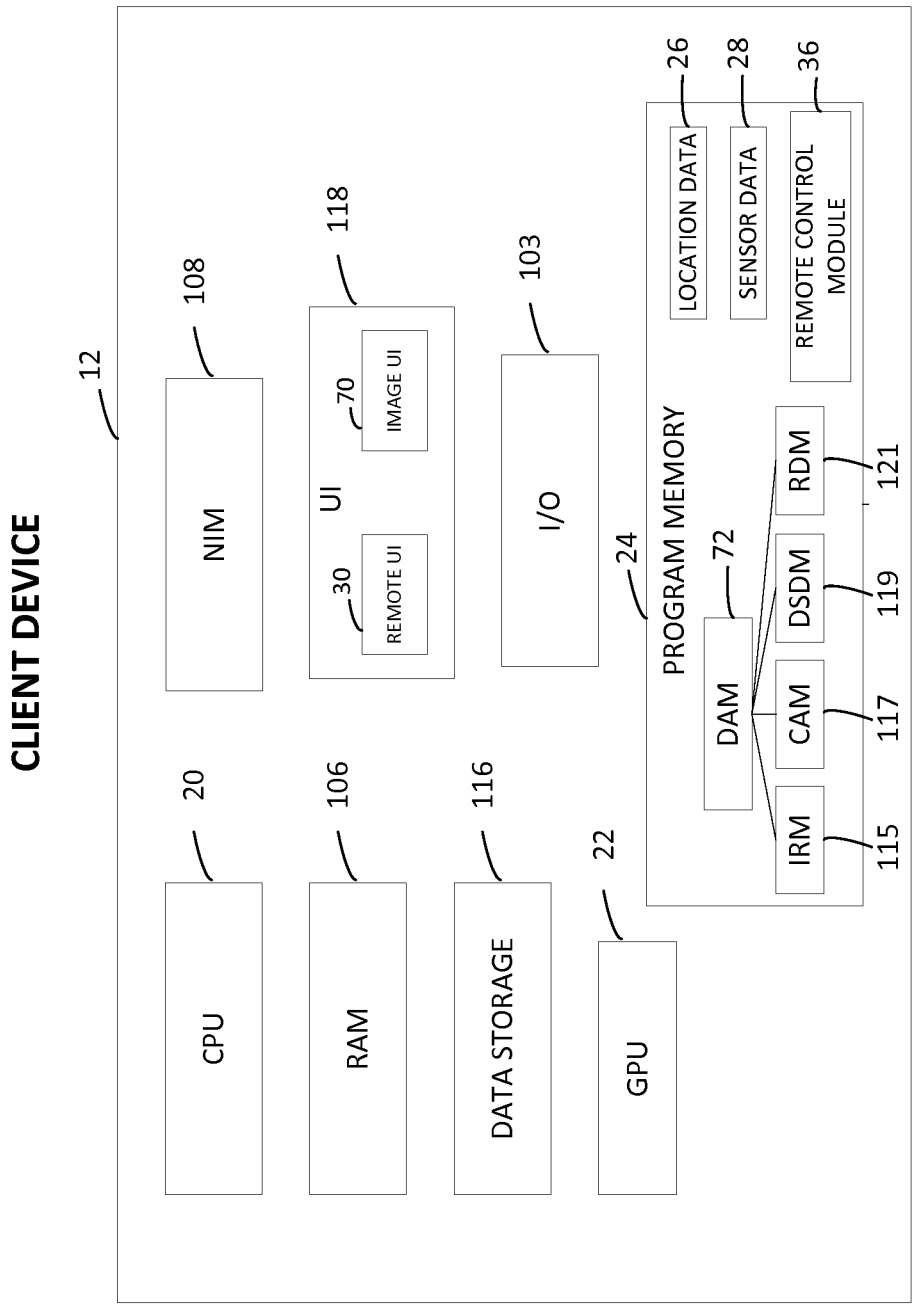
FIG. 1B illustrates a block diagram of an exemplary mobile device.

FIG. 1B illustrates the client device 12 of FIG. 1A in further detail. As illustrated in FIG. 1A, the client device may include a CPU 20, a GPU 22, and a memory 24 which may be a hard drive, an optical drive, a solid state memory device, or any other non-volatile memory device. The client device 12 may further include an input/output (I/O) unit 103 and a data storage 116, which may include customer data, location data, previous image data, financial data, etc., which may be retrieved from software instructions which may be stored in the memory 24. During execution, the software instructions may be stored in, and may store and retrieve data from, a volatile or non-volatile memory source, such as a random access memory (RAM) 106. The client device 12 may include a network interface module (NIM) 108 for wired and/or wireless communications. The network interface module 108 may allow the device to communicate with one or more other devices such as the server 14, the satellite device 18, the MAV, or the UAV(s) 40 of FIG. 1A, by using one or more of any number of communications protocols including, by way of example and not limitation, Ethernet, cellular telephony, IEEE 802.11 (i.e., "Wi-Fi"), Fibre Channel, etc. The memory 24 may store a damage assessment module 72 as described above. The damage assessment module 72 may be a sub-routine of a software application or may be an independent software routine in and of itself. Alternatively, in some implementations, the damage assessment module 72 may be a hardware module or a firmware module. The damage assessment module 72 may include compiled instructions directly executable by the CPU 20, scripted instructions that are interpreted at runtime, or both.

The client device may also include a user interface (UI) 118 which includes the remote user interface 30 and the image user interface 70 of FIG. 1A. The remote user interface 30 may include user controls for directing the UAV(s) 40 to capture images, deploy resources or retrieve items from a property, for requesting aerial images from the MAV or for requesting satellite images from the satellite device 18 at specific locations. On the other hand, the image user interface 70 may display aerial images of properties within a neighborhood and may also display damage severity levels for property components of the insured properties.

The damage assessment module (DAM) 72 may contain one or more of an image receiving module (IRM) 115, a condition assessment module (CAM) 117, a damage severity determination module (DSDM) 119 and/or a resource deployment module (RDM) 121. The DAM 72 may determine the severity of the damage (also referred to herein as a "damage severity level") associated with each insured property in a neighborhood according to the presently described techniques. In some embodiments, the DAM 72 may determine a damage severity level associated with one or more property components of an insured property. More specifically, the DAM 72 may automatically determine the condition of insured properties based on stored and received aerial images and/or other data describing property such as residential or commercial buildings. The aerial images may be stored in the memory 24 and/or RAM 106. In instances where the DAM 72 executes on a server device, the damage severity level for an insured property may be transmitted to the client device 12. Additionally, the DAM 72 may perform certain calculations on the server device 14 of FIG. 1A while other calculations are performed on the client device 12. Moreover, the memory 24, may also include a remote control module 36 and location data 26 and sensor data 28 on which the remote control module 36 operates as described above with reference to FIG. 1A.

Figure 2:
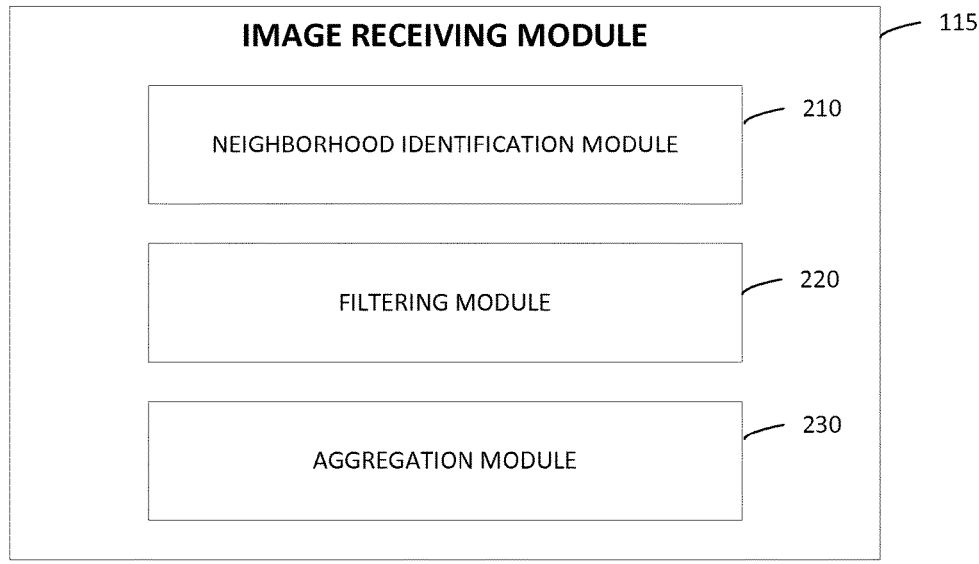
FIG. 2 illustrates a block diagram detailing an exemplary embodiment of an image receiving module.

FIG. 2 is a block diagram detailing an exemplary embodiment of the image receiving module 115 according to the present disclosure. The image receiving module 115 may include a neighborhood identification module 210, a filtering module 220 and an aggregation module 230. The neighborhood identification module 210, filtering module 220 and aggregation module 230 may be separate modules or may be combined and may interact with each other and/or with other software, hardware, and/or firmware.

The neighborhood identification module 210 may identify a neighborhood that has been affected by a catastrophe. To identify a neighborhood affected by a catastrophe, the neighborhood identification module 210 may connect to a third-party server (not shown). The third-party server can include data from news sources (e.g., national news networks, regional news networks, newspapers, magazines, news websites, and others), data from weather sources (e.g., the National Oceanic and Atmospheric Administration; other federal, state, or local governmental weather bureaus; commercial weather services; weather websites; and others), data from governmental sources (e.g., the Department of the Interior, the Department of Homeland Security, other federal, state, and local governmental sources, and others), data from social networks (e.g., Facebook®, Twitter®, Google+®, Instagram®, and others), data from public databases, data from private databases (e.g., consultants, data miners, surveyors, and others), crowd sourced weather data (e.g., connected users or user devices may report extreme weather conditions to a central server) or other sources. The neighborhood identification module 210 may then use this data to determine whether or not a catastrophe has occurred and where it has occurred. Moreover, in some embodiments the client device 12 user such as an insurance agent, may input information related to a catastrophe into the client device 12 which may be provided to the neighborhood identification module 210. Neighborhoods affected by a catastrophe may include those neighborhoods impacted by a tornado, hurricane, avalanche, earthquake, flood, tsunami, volcanic eruption, hail storm, wildfire, thunderstorm, nuclear incident, war, act of terrorism, etc.

In some embodiments, the neighborhood identification module 210 may only identify neighborhoods affected by a catastrophe and having a concentration of properties insured by an insurance provider that is above a predetermined concentration threshold. For example, the predetermined concentration threshold may be 20 percent of properties. Such neighborhoods may be identified by selecting a set of boundaries which encapsulate the neighborhood and determining the number of properties which are insured by the insurance provider as compared to the number of properties which are not insured by the insurance provider within the set of boundaries. For example, the set of boundaries may be GPS coordinates or alternatively a radius may be specified from a center point within the neighborhood. In other embodiments, all neighborhoods affected by a catastrophe may be identified by the neighborhood identification module 210. In any event, when a neighborhood is identified, the damage assessment module 72 may request and/or receive aerial images of the identified neighborhood. For example, the damage assessment module 72 may receive the aerial images of the identified neighborhood from the satellite device 18 of FIG. 1A, the MAV, or from the UAV(s) 40. The aerial images may be received from the UAV(s) 40 by automatically directing the one or several UAV(s) 40 to fly within the set of boundaries which encapsulate the identified neighborhood. The UAV(s) 40 may also be directed to take several photographs or capture video at different locations within the neighborhood and at several angles. Alternatively, after the neighborhood is identified, a user such as an insurance agent may control the UAV(s) 40 remotely, through a series of user controls on the remote user interface 30 to cause the UAV(s) to take pictures at different locations within the neighborhood and at several angles.

After the aerial images are captured and received for the identified neighborhood, the damage assessment module 72 may use the filtering module 220 to filter out aerial images that do not display insured properties, and to group together all of the aerial images which display a single insured property. For example, the filtering module 220 may use the customer data and the location data stored in the data storage entity 116 or the customer database 66 and the location database 68 of the server 14 to determine the locations of insured properties. The locations of insured properties may be compared to a received aerial image which contains GPS coordinates of its data points, as described above, to determine whether the received aerial image displays an insured property. For example, if the location of the aerial images matches with one of the locations of the insured properties then the aerial image displays an insured property. If the received aerial image does not display any insured properties the aerial image may be discarded. In some embodiments, none of the aerial images are discarded, and all of the aerial images are utilized, for example, for deploying resources to the properties in the neighborhood. In any event, the filtering module 220 may group the remaining received aerial images with other aerial images which display the same property. In some embodiments, an aerial image may display more than one property. In this instance, the aerial image may be grouped with each of the properties that the image displays.

Each group of aerial images which displays the same property may be combined using an aggregation module 230. The group of aerial images may be combined to generate a 3D image of the property using 3D imaging techniques such as stereoscopy or photogrammetry. The aggregation module 230 may utilize the Cartesian or GPS coordinates received with each aerial image to reconstruct a 3D image of the property using the group of aerial images captured at different locations and angles. The aggregation module 230 may combine each group of aerial images to generate a 3D aerial image of each property including each insured property in the neighborhood. The 3D aerial image may be created at a predefined level of detail (e.g., accurate to within ten percent) and/or may be adjustable (e.g., a user or the system may be able to "zoom in" or "zoom out")

Figure 3:
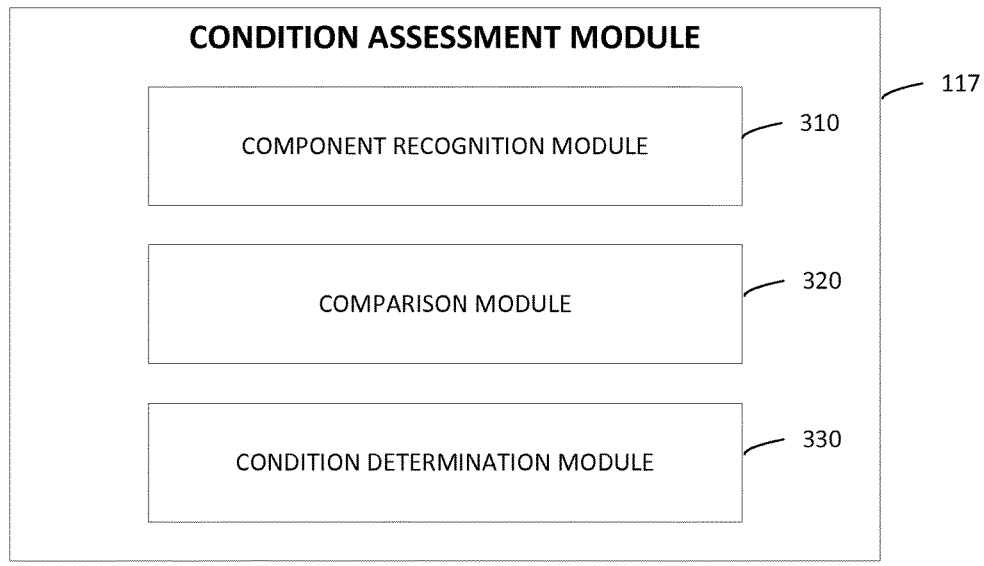
FIG. 3 depicts a block diagram detailing an exemplary embodiment of a condition assessment module.

FIG. 3 is a block diagram detailing an exemplary embodiment of the condition assessment module 117. The condition assessment module 117 may include a component recognition module 310, a comparison module 320 and a condition determination module 330. In some embodiments, the condition assessment module 117 may obtain a 3D aerial image of an insured property and determine the condition of the insured property. In other embodiments, the condition assessment module 117 does not obtain 3D aerial images and instead obtains 2D aerial images. Moreover, in some embodiments, the 3D aerial image may be obtained from the image receiving module 115. The condition assessment module 117 may obtain one 3D aerial image of an insured property at a time or alternatively may obtain several 3D aerial images depicting each of the insured properties in a neighborhood.

In any event, the component recognition module 310 may determine property components of an aerial image of an insured property or of another property. Property components may include a roof, a door, a window, siding, exterior walls, a lawn, a backyard, a foundation, a driveway, a garage, an outdoor swimming pool, a fence, a tree, a deck, a patio, etc. The component recognition module 310 may determine a portion of an aerial image of the property which displays a particular property component. For example, the component recognition module 310 may determine a door of the property by determining the data points in the aerial image which include the door. Various image processing techniques such as edge detection may be used by the component recognition module 310 for determining the data points of an aerial image which depict a particular property component.

Once the property components are determined for an aerial image or for several aerial images in a neighborhood, each property component may be compared with other predefined property components using the comparison module 320. The comparison module 320 may compare the data points of a property component with data describing one or more predefined property components corresponding to the same property component. If the property component is a roof, for example, the comparison module 320 may compare data extracted by the component recognition module 310 with previously stored images of brand-new "stock" tiles and of an intact roof. Based on these comparisons, the comparison module 320 may determine physical differences between the roof depicted in the data points and the stock components (e.g., brand new roof tiles). For example, the comparison module 320 may determine that the data points depicting the roof differ in color (e.g., due to weather aging), thickness (e.g., due to cracks or dents in the surface), and/or in height/width (e.g., due to chipping on one or more edges) from the brand-new "stock" tiles.

Moreover, the comparison module 320 may also compare the data depicting a roof or other property component with a previously stored image of the same roof which was captured, for example, before the catastrophe occurred. In this manner, the comparison module 320 can determine the change in the condition of a property component due to the catastrophe. In some embodiments, the previously stored image may have been captured during the underwriting or re-underwriting process as described in aforementioned, co-pending U.S. patent application Ser. No. 14/510,307 entitled "METHOD AND SYSTEM FOR DETERMINING THE CONDITION OF INSURED PROPERTIES IN A NEIGHBORHOOD." The previously stored image of the same roof may be obtained from the previous image data 94 stored at the server 14 or the client device 12 of FIG. 1A.

After an aerial image of a property is captured, the aerial image may be stored in the previous image data 94, so that it may be compared with a newly captured image of the same property at a later date. In this manner, the comparison module 320 may determine whether or not the damage to a property component was caused by the catastrophe. For example, if the previously stored image of the roof shows the roof in the same poor condition before the catastrophe, then the catastrophe did not cause the damage to the roof. Moreover, if the roof was previously in poor condition, then the condition of the roof may have been worsened by the catastrophe but the majority of the damage may have been caused by degradation to the roof already in poor condition, rather than the catastrophe. However, these are merely examples and the comparison module 320 may determine any number of ways in which the condition of a property or property component has changed.

After comparisons have been made for each property component in an insured property or in a neighborhood, a condition determination module 330 may determine both the condition of property components as well as the change in condition of property components due to the catastrophe. Conditions may include condition categories such as "poor," "fair," "moderate," "good," "excellent," etc., or may include numerical condition scores, for example a scale of one to one hundred. For example, with reference to the roof example described above, a roof having several cracks or dents in the surface may be determined to be in poor condition.

Changes in condition may also include categories such as "no change," "change due to catastrophe," "change from excellent to poor," "change from moderate to fair," etc., or may include numerical change in condition scores, corresponding to the numerical condition scores. For example, if the condition of the property component before the catastrophe is represented by a score of five and the condition of the property component after the catastrophe is represented by a score of two, then the change in condition score may be three. In addition to determining the overall condition of a property component, the condition determination module 330 may determine the cause of the condition as well as the size of the property component or the size of a portion of the property component which requires repair. For example, the condition determination module 330 may determine a window is in "poor" condition, because one window pane is broken. Moreover, the condition determination module 330 may determine the size of the window pane based on the GPS coordinates of an aerial image depicting the window. This information may be used in the claim assessment analysis to determine the cost of replacing one window pane rather than the entire window.

Figure 4:
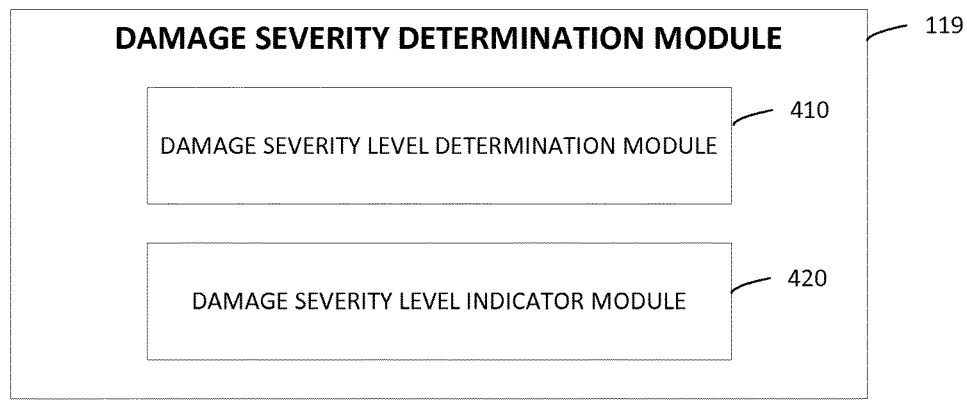
FIG. 4 depicts a block diagram detailing an exemplary embodiment of a damage severity determination module.

Each property component along with the respective condition and change in condition determined for each property component may then be provided to a damage severity determination module, such as the damage severity determination module 119 as depicted in FIG. 4. The damage severity determination module 119 may include a damage severity level determination module 410, and a damage severity level indicator module 420. The damage severity level determination module 410 may determine that a property component belongs to a particular damage severity level category from a set of damage severity level categories. For example, the set of damage severity level categories may include "low damage," "moderate damage," "high damage," "total loss," "no loss," "very low damage," "very high damage," etc. In other embodiments, the damage severity determination module 410 may determine a score for a property component, such as a numeric percentage representing the amount of loss to the property component. For example, the damage severity determination level module 410 may determine 100 percent loss for a missing roof, or a roof which needs to be completely replaced. On the other hand, the damage severity level determination module 410 may determine 50 percent loss for dented or cracked siding, which can be repaired and does not need to be replaced. In some embodiments, the damage severity level determination module 410 may determine a damage severity level category for a property component based on the amount of loss to the property component. For example, the damage severity level determination module 410 may determine property components having less than 20 percent loss or some other predetermined loss threshold are within the "low" category, property components having between 20 and 65 percent loss are within the "moderate" category and property component having more than 65 percent loss are within the "high" category. In some embodiments, the damage severity level determination module 410 may determine the amount of loss caused by the catastrophe, while in other embodiments the overall amount of loss may be determined.

In any event, the damage severity level determination module 410 may determine the amount of loss for a property component based on the condition and/or the change in condition of the property component. For example, there may be a higher amount of loss determined for a door in poor condition than a door in excellent condition. However, in some embodiments the damage severity level determination module 410 may determine that there is no loss for the door in poor condition when the door was also in poor condition before the catastrophe occurred. The amount of loss may also be determined based on whether the property component needs to be replaced or can be repaired. Property components requiring replacement may correspond to a higher amount of loss than property components requiring repair. The damage severity level determination module 410 may include a set of rules for determining whether a particular property component needs to be repaired or can be replaced based on its condition. For example, a driveway in poor condition may need to be replaced whereas a door in the same poor condition may be repaired. The damage severity level may then be determined based on the amount of loss, as described above.

Once the damage severity level is determined for each property component or alternatively once the damage severity level is determined for a single property component, the damage severity level indicator module 420 may assign a damage severity level indicator to each property component. For example, each damage severity level category from the set of damage severity level categories may be assigned a respective damage severity level indicator. In some embodiments, the damage severity level indicator may be a color selected from a set of colors. More specifically, the "moderate" damage severity level category may correspond to the color yellow, for example. Moreover, the "high" or "total loss" damage severity level category may correspond to the color red, and the "low" or "no loss" damage severity level category may correspond to the color green. In other embodiments, a range of damage severity level percentages may be assigned a damage severity level indicator. For example, damage severity level percentages less than 20 percent may correspond to the color green. The corresponding damage severity level indicators may then be assigned to each property component based on the determined damage severity level for the property component. For example, a piece of siding with moderate damage may be assigned the color yellow. An assigned damage severity level indicator for a property component may then be appended to one or more aerial images which may be 3D aerial images and which display the property component. For example, an aerial image displaying the piece of siding may display the color yellow overlaying the piece of siding.

While the damage severity level indicators are described as the colors red, green and yellow, the indicators are not limited to those particular colors. Instead, the damage severity level indicators may include any color and also may include any other suitable representation of a damage severity level. For example, damage severity level indicators may include numbers which are placed over each property component, labels, symbols, different shading techniques, etc.

The aerial images which display properties and include damage severity level indicators may then be displayed on the client device 12 for an insurance agent to view. In some embodiments, the client device 12 may display a 3D aerial image of a property with damage severity level indicators overlaying each property component. Moreover, in some embodiments, the client device 12 may display several aerial images for a single property and include the damage severity level indicators for each property component. As mentioned above, some aerial images may display more than one property and as a result, may be included in both sets of aerial images which display a first and a second property.

In some embodiments, the damage assessment module 72 may include a set of rules for determining a claim assessment based on the damage severity levels of the various property components corresponding to an insured property. For example, the damage assessment module 72 may determine a cost estimate for repairing or replacing each property component based on its corresponding damage severity level. In some embodiments, the set of rules may include a table with a predetermined cost estimate for the different types of property components as well as their respective quality (e.g., a Victorian style roof may not be repaired by adding a section of standard roof tiles), size (e.g., based on square footage) and damage severity level. For example, the set of rules may include a cost estimate of $500 for a small, low quality driveway with moderate damage. The set of rules may be stored in the financial database 96. Cost estimates for each respective property component of a property may be aggregated and/or combined to determine an appropriate claim assessment and/or to "pre-fill" one or more forms associated with an insurance claim. In some instances, the property owner may not qualify for recovery from the insurance provider (e.g., based on the analysis by the claim assessment, there was no damage to the property or the damage was so minimal as not to qualify for recovery). In such cases, the system may notify the property owner that she may not be eligible for recovery if she files a claim. In other embodiments, an insurance agent or a user of the client device 12 may view the damage severity levels of the various property components and determine the appropriate claim assessment for the insured property.

Figure 5:
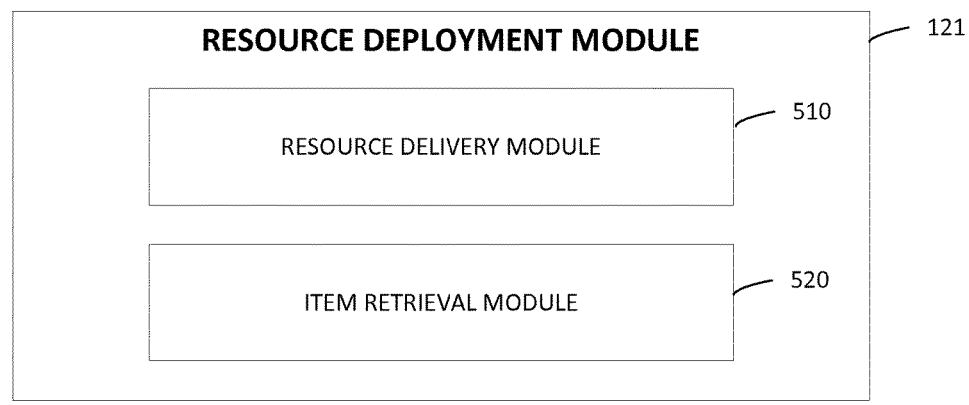
FIG. 5 depicts a block diagram detailing an exemplary embodiment of a resource deployment module.

FIG. 5 is a block diagram detailing an exemplary embodiment of the resource deployment module 121. The resource deployment module 121 may include a resource delivery module 510, and an item retrieval module 520. In some embodiments, the resource deployment module 121 may receive the damage severity level of a property or property component from the damage severity determination module 119 of FIG. 4. The damage severity level may be compared to a predetermined damage severity threshold level, and when the damage severity level exceeds the threshold, the resource delivery module 510 may automatically communicate with the UAV(s) 40 or another device, which may be an MAV, over the communication network 16 of FIG. 1 and direct the UAV(s) 40 or another device to deploy certain resources to the property. Resources may include food, water, a healing substance, containers, storage boxes, rescue assistance, etc. For example, if the threshold level is "moderate" damage, and a roof is determined to have "total loss," the resource delivery module 510 may automatically direct the UAV(s) 40 to place tarp or another healing substance over the property for shelter. Moreover, the resource delivery module 510 may transmit instructions via the communication network 16 to another device, instructing the device or device users to place tarp over the property. In other embodiments, the resource delivery module 510 may provide user controls on the remote user interface 30 of the client device 12 of FIG. 1 configured to receive a selection from the user of a resource to deploy. The user may utilize the remote control module 36 to guide the UAV(s) 40 to a desired location for deploying the resource and then select a resource on the remote user interface 30 from a list of deployable resources physically stored on the UAV(s) 40. For example, the UAV(s) 40 may store food and water, and the user may select a user control for deploying water to the property. As a result, a claw, robot arm, or electronic grabber in the UAV(s) 40 may deploy the water.

In other embodiments, when the UAV(s) 40 is/are utilized for capturing the aerial images of the neighborhood, the images may be transmitted in real-time to the client device 12. If a user of the client device 12 sees, for example, people trapped in one of the properties in the neighborhood, the user may select one of the user controls for the UAV(s) 40 to immediately deploy selected resources to the property, while the UAV(s) 40 is/are in the air capturing aerial images of the neighborhood. Moreover, the user may select a user control on the client device 12 to alert the proper authorities for rescue assistance. For example, the client device 12 may automatically send a short message service (SMS) text message to emergency personnel including the location of the property.

In addition to deploying resources, the resource deployment module 121 may include an item retrieval module 520 for retrieving valuable items from a property after a catastrophe. For example, there may be items in a destroyed home which remain intact. The items may be located in a crevice or another place which is hard to reach or which may be dangerous. The item retrieval module 520 may direct the UAV(s) 40 to the location of the property, and more specifically to the exact location of the items based on the aerial images. For example, the item retrieval module 520 may receive an aerial image displaying the property and determine the GPS location of a particular item within the property. The item retrieval module 520 may then communicate the determined location to the UAV(s) 40 as well as instructions to retrieve the particular item. Then the UAV(s) 40 may utilize proximity sensors 44 to find the item and retrieve it using an electronic grabber, claw, or robot arm as mentioned above. In some embodiments, a user may direct the UAV(s) 40 using the remote user interface 30 on the client device 12. The remote user interface 30 may further include user controls for picking up the item using the electronic grabber, claw or robot arm.

Figure 6:
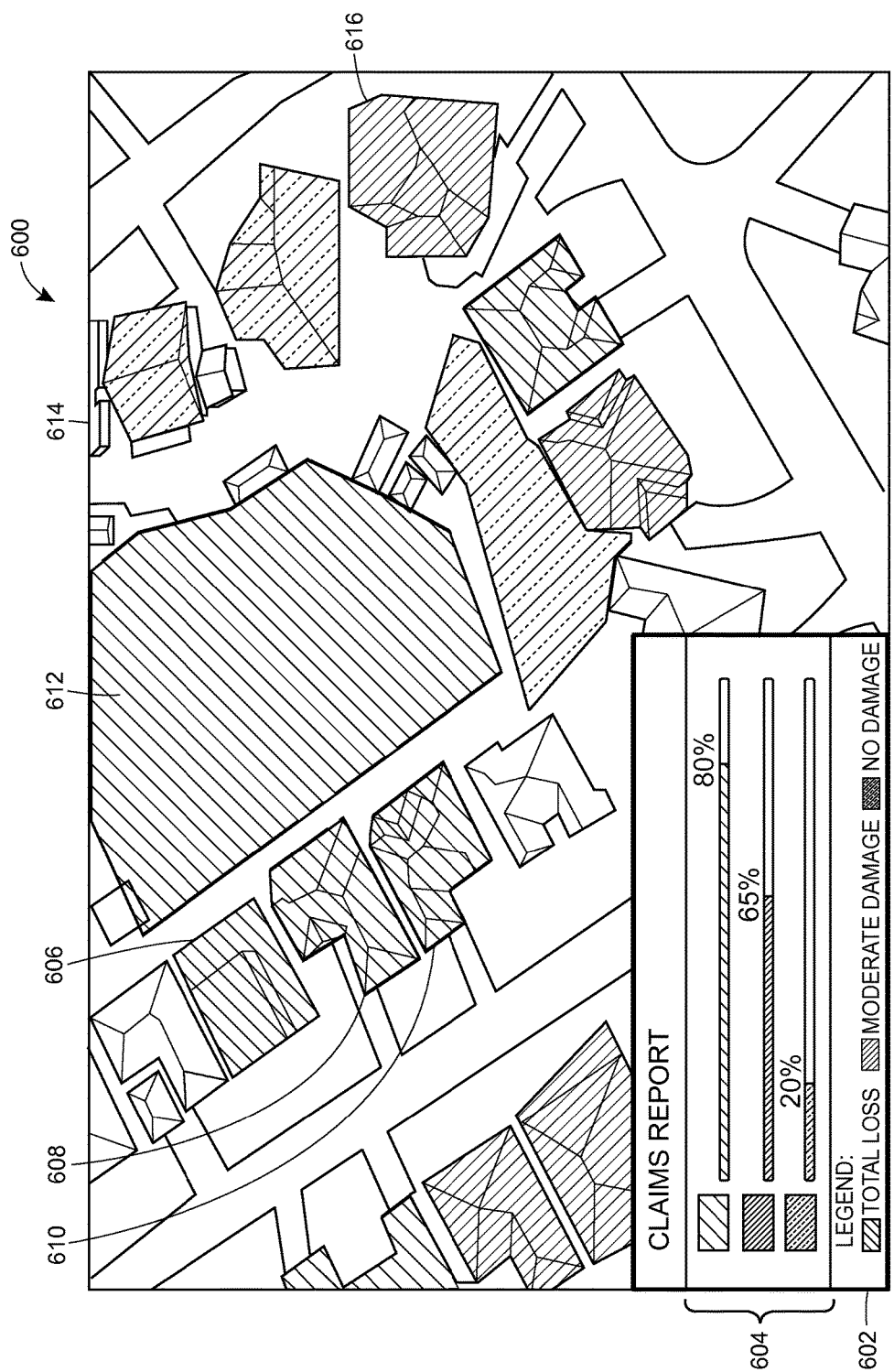
FIG. 6 depicts an exemplary display of insured properties including damage severity level indicators.

FIG. 6 illustrates an exemplary display 600 from an aerial image of insured properties including damage severity level indicators. In some embodiments, the display 600 may be presented on the image user interface 70 of the client device 12 of FIG. 1A. In other embodiments, the display may be presented on another computing device. The display 600 may include a legend 602 which explains the meaning of each damage severity level indicator present on the display 600. For example, the legend 602 explains a red color indicates "total loss," a yellow color indicates "moderate damage," and a green color indicates "no damage." Moreover, the display may also include a key 604 describing the amount of loss which corresponding to each damage severity level indicator or category. For example, the key 604 describes a red color indicates 80 percent loss, a yellow color indicates 65 percent loss and a green color indicates 20 percent loss. In some embodiments, the green color may indicate less than 20 percent loss, the yellow color may indicator between 20 and 80 percent loss and the red color may indicate more than 80 percent loss.

Additionally, the display 600 may include several properties within a neighborhood. In some embodiments, the damage severity level indicators may be displayed on insured properties only and in other embodiments the damage severity level indicators may be displayed on all properties within the neighborhood. In any event, a first property 606 has a red damage severity level indicator displayed on the roof, indicating that the roof has experienced "total loss." Similarly, the display of the two adjacent properties 608 and 610 also indicates roofs with "total loss." Immediately to the right of the first property 606 is a large section of rubble 612 identified by a red color as having "total loss." This large section of rubble 612 may have been properties which were completely destroyed by the catastrophe. In response to this aerial image, the resource deployment module 121 or a user may view another image of the neighborhood at a higher zoom level, and if there are people trapped in the rubble 612, one or several UAV(s) 40 or another device may be directed to deploy resources such as rescue assistance to the rubble 612.

Further, to the right of the rubble 612 is a second property 614 with a green damage severity level indicator displayed on the roof, indicating that the roof for the second property 614 has experienced "no damage." This may be because the roof for the second property 614 is still intact and in good condition. However, the roof may be in poor condition but the condition assessment module 117 of FIG. 3 may have determined that the roof was in poor condition prior to the catastrophe and as a result there is no damage due to the catastrophe. In any event, just below the second property 614 is an adjacent property having a roof with "no loss." Immediately below the adjacent property is a third property 616 with a yellow damage severity level indicator displayed on the roof, indicating that the roof for the third property 616 has experienced "moderate damage." While "total loss" may indicate the property or property component needs to be replaced, "moderate damage" may indicate that repair rather than replacement is necessary. However, in some embodiments, repairing or replacing a property component may depend on the type of component. For example, roofs may require replacement when experiencing "moderate damage," while a door may require repair when experiencing the same amount of loss.

The aerial image of the display 600 may be just one of several images of the properties 606-616. In addition to the roofs, the aerial images may also display other property components of the properties 606-616 such as doors, windows, siding, etc., as well as their respective damage severity level indicators. These property components may be shown more clearly from aerial images taken at a different angle, location and/or zoom level as the display 600. Further, in some embodiments, several aerial images capturing a particular property in the neighborhood at different angles may be aggregated to determine an overall amount of loss. For example, the display 600 may indicate that the extent of the damage to the roof of the first property 608 is "total loss." Another display may indicate the extent of the damage to the doors, windows, siding, garage, driveway, backyard, etc. A user such as an insurance agent or the damage assessment module 72 may determine the amount of loss to each property component to calculate a cost estimate and combine the cost estimates for each property component to determine a claim assessment for the entire property.

Figure 7:
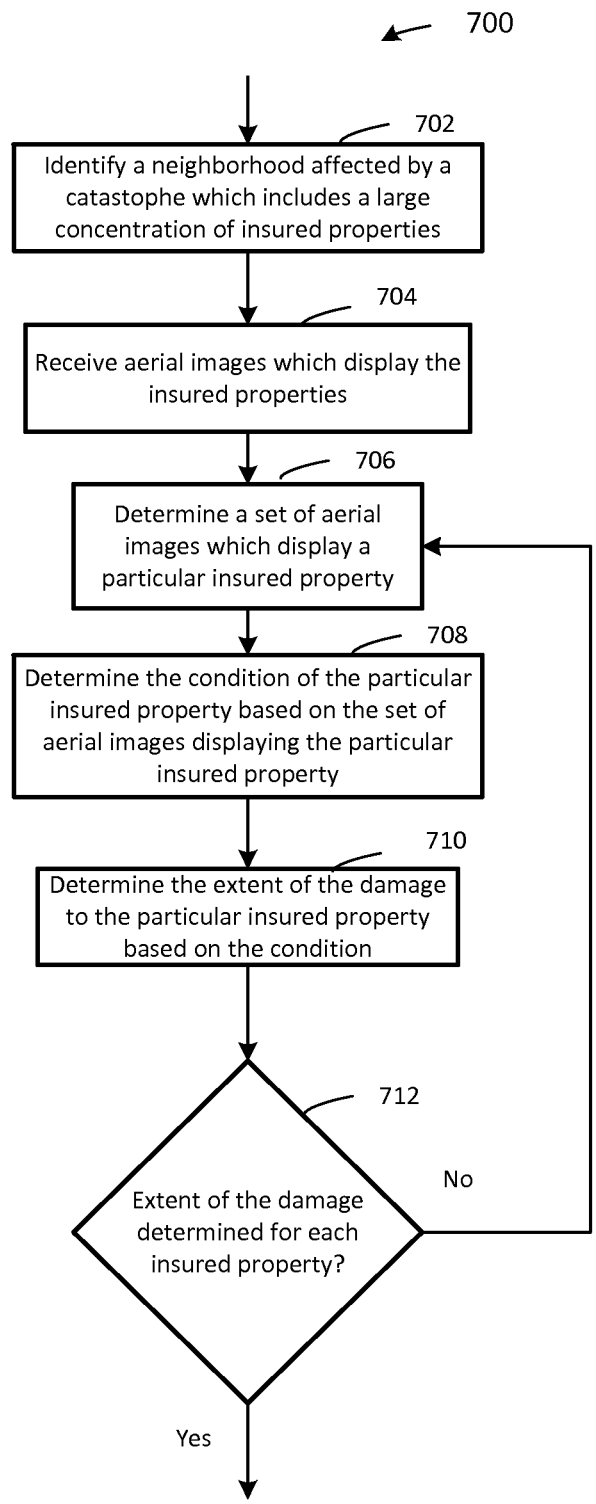
FIG. 7 illustrates a flow diagram representing an exemplary method for performing automatic claim assessments of insured properties in a neighborhood in accordance with the presently described embodiments.

FIG. 7 illustrates a flow diagram representing an exemplary method 700 for performing automatic claim assessments of insured properties in a neighborhood. The method 700 may be executed on the client device 12, the server computer 14 or some combination of the client device 12 and the server compute 14. For example, at least a portion of the method 700 may be performed by the damage assessment module 72 of FIG. 1A which as mentioned above, may be disposed on the client device 12, the server computer 14 or some combination of the client device 12 and the server computer 14. In an embodiment, the damage assessment module 72 may include computer-executable instructions stored on one or more non-transitory, tangible, computer-readable storage media or devices, and the computer-executable instructions of the damage assessment module 72 may be executed to perform the method 700.

At block 702, a neighborhood may be identified which is affected by a catastrophe and which includes a large concentration of insured properties. For example, neighborhoods having more than 20 percent of properties insured by the same insurance provider may be identified as having a large concentration of insured properties. Neighborhoods may be identified by selecting a set of boundaries which encapsulate the neighborhood and determining the number of properties which are insured by the insurance provider as compared to the number of properties which are not insured by the insurance provider within the set of boundaries. For example, the set of boundaries may be GPS coordinates or alternatively a radius may be specified from a center point within the neighborhood. Moreover, neighborhoods affected by a catastrophe may include those neighborhoods impacted by a tornado, hurricane, avalanche, earthquake, flood, tsunami, volcanic eruption, hail storm, wildfire, thunderstorm, nuclear incident, war, act of terrorism, etc.

Then, aerial images which display the insured properties in the neighborhood may be received (block 704). The aerial images may be received from the satellite device 18, the MAV, or the UAV(s) 40 of FIG. 1A. In some embodiments, user controls may be disposed on the client device 12 which allow a user, such as an insurance agent, to control the UAV(s) 40 remotely and determine when and where to capture aerial images. In other embodiments, the UAV(s) 40 may be preprogrammed to capture aerial images at specified locations. Additionally, in some embodiments, the satellite device 18 or the UAV(s) 40 may capture aerial images of the entire neighborhood.

At block 706, the damage assessment module 72 may determine a set of aerial images which display a particular insured property of the several insured properties in the neighborhood. For example, the location of the particular insured property may be determined. Then each aerial image which displays the same location as the insured property may be grouped into the set of aerial images which display the particular insured property. In some embodiments, when an aerial image displays more than one insured property, the aerial image is grouped into the set of aerial images for each insured property it displays. Moreover, in some embodiments, the set of aerial images may be aggregated to form a 3D display of the particular insured property. For example, the set of aerial images may be aggregated using photogrammetry techniques to create the 3D image.

Then, the condition of the particular insured property may be determined based on the set of aerial images which display the particular insured property (block 708). In some embodiments, the particular insured property may be divided into several property components and a condition may be determined for each property component. The condition may be determined by comparing the property component to a previous image of the property component taken before the catastrophe occurred. In some embodiments, the condition of the property may be determined as the change in condition of the property from before the catastrophe. Additionally, the condition may be determined by comparing the property component to a similar property component in good condition and identifying differences between the two. In an embodiment, an overall condition of the insured property may be determined based on the condition of each property component.

Based on the condition or the change in condition of the particular insured property, a damage severity level may be determined (block 710). For example, a damage severity level score or a damage severity level category may be determined for each property component of the particular insured property. The damage severity level score or category may be determined for a property component based on the based on the condition and/or the change in condition of the property component. Additionally, the damage severity level score or category may be determined using a set of rules. A damage severity level indicator may then be assigned to each property component based on the determined damage severity level. Moreover, in some embodiments, the damage severity level indicators may be displayed along with a display of the aerial images for the particular insured property, for example, on the client device 12.

At block 712, the damage assessment module 72 may determine whether or not a damage severity level has been determined for all of the insured properties in the neighborhood. If a damage severity level has not been determined for every insured property, the method 700 continues at block 706 and a set of aerial images which display another insured property in the neighborhood is determined. Otherwise, if a damage severity level has been determined for every insured property, the process ends.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A method for assessing damage to insured properties in a neighborhood, the method executed by one or more processors programmed to perform the method, the method comprising:

identifying, by the one or more processors, a neighborhood including a concentration of insured properties which is above a predetermined threshold concentration level, wherein the neighborhood has been affected by a natural or a man-made disaster;

capturing, by an aerial image capturing device having one or more stabilization sensors which control aerial movement of the aerial image capturing device, an image sensor, and a physical storage space for transporting resources, a plurality of aerial images which display the neighborhood including the insured properties;

receiving, at the one or more processors, the plurality of aerial images from the aerial image capturing device; and for each of the insured properties in the identified neighborhood:

determining, by the one or more processors, one or more aerial images of the plurality of aerial images which display at least a portion of a same insured property of the insured properties;

for each of one or more components of the insured property:

determining, by the one or more processors, a condition of the component of the insured property based on the respective one or more aerial images corresponding to the insured property;

assessing, by the one or more processors, a damage severity level of the component of the insured property for determining a claim assessment based on the determined condition of the component of the insured property;

assigning, by the one or more processors, a damage severity level indicator to the component of the insured property based on the damage severity level; and deploying, by the one or more processors via the aerial image capturing device, one or more resources to the insured property based on the damage severity level; and causing, by the one or more processors, the insured property to be displayed on a user interface and the one or more damage severity level indicators to be displayed overlaying the one or more corresponding components of the insured property on the user interface.

2. The method of claim 1, wherein a condition of the component of the insured property is a present condition and wherein assessing a damage severity level of the component of the insured property comprises:

determining, by the one or more processors, a past condition of the component of the insured property, wherein the past condition is based on one or more respective aerial images corresponding to the insured property which were captured before the neighborhood was affected by the natural or man-made disaster;

comparing, by the one or more processors, the present condition to the past condition of the respective component of the insured property; and determining, by the one or more processors, the damage severity level for the component of the insured property based on the comparison between the present and the past conditions of the respective component of the insured property.

3. The method of claim 1, further comprising:
directing, by the one or more processors, the aerial image capturing device to one or more locations for capturing the plurality of aerial images.

4. The method of claim 1, wherein the plurality of aerial images are received via a satellite.

5. The method of claim 1, further comprising
determining, by the one or more processors, a claim amount for at least one of the insured properties based on the respective damage severity level before an owner of the at least one insured property files an insurance claim.

6. The method of claim 5, wherein determining a claim amount comprises pre-filling at least one form associated with the insurance claim for the at least one insured property.

7. The method of claim 1, wherein one or more components of the insured property comprises at least one of: a window, a door, a roof, siding, an exterior wall, a garage, a backyard, a swimming pool, a lawn, a foundation, a driveway, a fence, a tree, a deck, or a patio.

8. The method of claim 1, wherein assessing a damage severity level of the insured property comprises:
determining, by the one or more processors, a plurality of damage severity level categories;
assigning, by the one or more processors, a damage severity level indicator to each of the plurality of damage severity level categories;
adding, by the one or more processors, the damage severity level indicator to each of the one or more components of the insured property based on a damage severity level of each component; and
displaying, by the one or more processors, the damage severity level indicator for each component on the displayed one or more aerial images on the user interface.

9. The method of claim 1, wherein the one or more resources includes at least one of: water, food, storage boxes, containers, a healing substance, rescue assistance, a survival kit, or tools.

10. The method of claim 1, further comprising:
directing, by the one or more processors, the aerial image capturing device to retrieve an item from at least one of the insured properties in the neighborhood.

11. The method of claim 1, wherein a natural or man-made disaster includes at least one of: a tornado, a hurricane, an avalanche, an earthquake, a flood, a tsunami, a volcanic eruption, a hail storm, a wildfire, a thunderstorm, a nuclear incident, a war or an act of terrorism.

12. A system for assessing damage to insured properties in a neighborhood, the system comprising:
an aerial image capturing device which captures a plurality of aerial images that display insured properties, wherein the aerial image capturing device includes one or more stabilization sensors which control aerial movement of the aerial image capturing device, an image sensor, and a physical storage space for transporting resources;
a user interface;
a communication network; and
one or more computing devices communicatively coupled to the communication network and the user interface, each of the one or more computing devices having a memory and one or more processors and at least one of the computing devices configured to:
identify a neighborhood including a concentration of insured properties which is above a predetermined threshold concentration level, wherein the neighborhood has been affected by a natural or a man-made disaster;
receive a plurality of aerial images from the aerial image capturing device, wherein the plurality of aerial images display the neighborhood including the insured properties; and
for each of the insured properties in the identified neighborhood:
determine one or more aerial images of the plurality of aerial images which display on the user interface at least a portion of an insured property of the insured properties;
for each of one or more components of the insured property:
determine a condition of the component of the insured property based on the respective one or more aerial images corresponding to the insured property;
assess a damage severity level of the component of the insured property for determining a claim assessment based on the determined condition of the component of the insured property;
assign a damage severity level indicator to the component of the insured property based on the damage severity level; and
deploy, via the aerial image capturing device, one or more resources to the insured property based on the damage severity level; and
cause the insured property to be displayed on the user interface and the one or more damage severity level indicators to be displayed overlaying the one or more corresponding components of the insured property on the user interface.

13. The system of claim 12, wherein a condition of the component of the insured property is a present condition and wherein to assess a damage severity level for the component of the insured property the at least one computing device is configured to:
determine a past condition of the component of the insured property, wherein the past condition is based on one or more respective aerial images corresponding to the insured property which were captured before the neighborhood was affected by the natural or man-made disaster;
compare the present condition to the past condition of the respective component of the insured property; and
determine the damage severity level for the component of the insured property based on the comparison between the present and the past conditions of the respective component of the insured property.

14. The system of claim 12, wherein the at least one computing device is further configured to at least one of:

display one or more user controls on the user interface configured to receive directions for navigating the aerial image capturing device; or direct the aerial image capturing device to one or more locations for capturing the plurality of aerial images.

15. The system of claim 12, wherein the plurality of aerial images are received via a satellite over the communication network.

16. The system of claim 12, wherein to assess a damage severity level of the insured property the at least one computing device is configured to:

determine a plurality of damage severity level categories;

assign a damage severity level indicator to each of the plurality of damage severity level categories;

add the damage severity level indicator to each of the one or more components of the insured property based on a damage severity level of each component; and display the damage severity level indicator for each component on the displayed one or more aerial images on the user interface.

17. A method for deploying resources to damaged properties, the method executed by one or more processors programmed to perform the method, the method comprising:

identifying, by the one or more processors, a neighborhood including properties wherein the neighborhood has been affected by a natural or a man-made disaster;

receiving, at the one or more processors, a plurality of aerial images from an aerial image capturing device having one or more stabilization sensors which control aerial movement of the aerial image capturing device, an image sensor, and a physical storage space for transporting resources, wherein the plurality of aerial images display the neighborhood including the properties; and for each of the properties in the identified neighborhood:

determining, by the one or more processors, one or more aerial images of the plurality of aerial images which display at least a portion of a property of the properties;

assessing, by the one or more processors, a damage severity level of the property based on a condition of the property; and directing, by the one or more processors via the aerial image capturing device, one or more resources to be deployed to the property based on at least one of: the damage severity level or the one or more aerial images of the property.

18. The method of claim 17, further comprising:

directing, by the one or more processors, the aerial image capturing device to retrieve an item from at least one of the properties in the neighborhood.

19. The method of claim 17, wherein a natural or man-made disaster includes at least one of: a tornado, a hurricane, an avalanche, an earthquake, a flood, a tsunami, a volcanic eruption, a hail storm, a wildfire, a thunderstorm, a nuclear incident, a war or an act of terrorism.

* * * * *